(12) United States Patent
Xuewen et al.

(10) Patent No.: US 8,505,094 B1
(45) Date of Patent: Aug. 6, 2013

(54) DETECTION OF MALICIOUS URLS IN A WEB PAGE

(75) Inventors: Zhu Xuewen, Nanjing (CN); Wan Xinochuan, Nanjing (CN); Ye Hua, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 727 days.

(21) Appl. No.: 12/686,458

(22) Filed: Jan. 13, 2010

(51) Int. Cl.
*G06F 21/00* (2006.01)
*G06F 11/00* (2006.01)
*G06F 12/16* (2006.01)
*G06F 15/16* (2006.01)
*G06F 15/173* (2006.01)
*G06F 17/30* (2006.01)
*G06F 13/00* (2006.01)
*H04L 29/06* (2006.01)

(52) U.S. Cl.
USPC ...... 726/22; 726/3; 726/23; 726/24; 709/224; 707/10

(58) Field of Classification Search
USPC ................ 726/22, 23, 3, 24; 709/224; 707/10
See application file for complete search history.

(56) References Cited

U.S. PATENT DOCUMENTS

| 2008/0208868 | A1* | 8/2008 | Hubbard | 707/10 |
| 2010/0017880 | A1* | 1/2010 | Masood | 726/24 |
| 2010/0186088 | A1* | 7/2010 | Banerjee et al. | 726/23 |
| 2010/0257592 | A1* | 10/2010 | Wang et al. | 726/3 |
| 2012/0222121 | A1* | 8/2012 | Staniford et al. | 726/24 |

FOREIGN PATENT DOCUMENTS

EP 1986399 A1 * 10/2008

OTHER PUBLICATIONS

Akiyama, M. ; Yagi, T. ; Itoh, M.; "Searching Structural Neighborhood of Malicious URLs to Improve Blacklisting"; Applications and the Internet (SAINT), 2011 IEEE/IPSJ 11th International Symposium on Digital Object Identifier: 10.1109/SAINT.2011.11; Publication Year: Jun. 2011, pp. 1-10.*

* cited by examiner

*Primary Examiner* — Nirav B Patel
*Assistant Examiner* — Courtney Fields
(74) *Attorney, Agent, or Firm* — Beyer Law Group LLP (57) ABSTRACT

Detection of malicious URLs in a Web page retrieved by a computer user is based in a backend security service or upon the user's computer. The HTML code download by the user is first scanned to detect any embedded links such as URLs found in frames or scripts. Features related to the layout of such a URL (position, visibility) are identified. Features related to the referring nature of the URL (page rank of parent, page rank of child) are identified. Features indicating the relevancy between the content of the parent Web page and the content of the Web page identified by the embedded URL identified. Each set of features is transformed into a binary vector and these vectors are fed into a decision engine such as a classifier algorithm. The classifier algorithm outputs a score indicating whether or not the suspect URL (and the Web page to which it links) is malicious or not. The user may be warned by a display message.

25 Claims, 7 Drawing Sheets

FIG. 1
(PRIOR ART)

| Build | Sample Set | Total Samples Input | Total Samples Detected | Detection Rate (%) |
|---|---|---|---|---|
| 1083 | Simple | 16235 | 13677 | 84.24% |
| Empty DOM Host | | | 13409 | 82.59% |
| 1084 | | | 13726 | 84.55% |
| 1083 | Simple | 2316 | 1881 | 81.22% |
| Empty DOM Host | | | 1866 | 80.57% |
| 1084 | | | 1894 | 81.78% |

Page Rank Database

FIG. 4
System Architecture

DETECTION OF MALICIOUS URLS IN A WEB PAGE

FIELD OF THE INVENTION

The present invention relates generally to malware prevention. More specifically, the present invention relates to detection of malicious URLs in Web pages.

BACKGROUND OF THE INVENTION

Computer users, in addition to being exposed to malware attached to e-mail messages, are now are facing malicious software threats from the World Wide Web. Even careful users that only visit trusted Web sites may fall victim if these sites are compromised by a malicious hacker. A hacker can hijack a legitimate site and inject malicious URLs into the Web pages of that site that either automatically open or, when selected, redirect innocent users to a site containing malware. The computer user would then unknowingly be exposed to malware which might be downloaded to the user's computer. Typically a so-called "landing page" Web page is the target of these hackers, but any Web page is susceptible to this type of attack.

Figure 1:
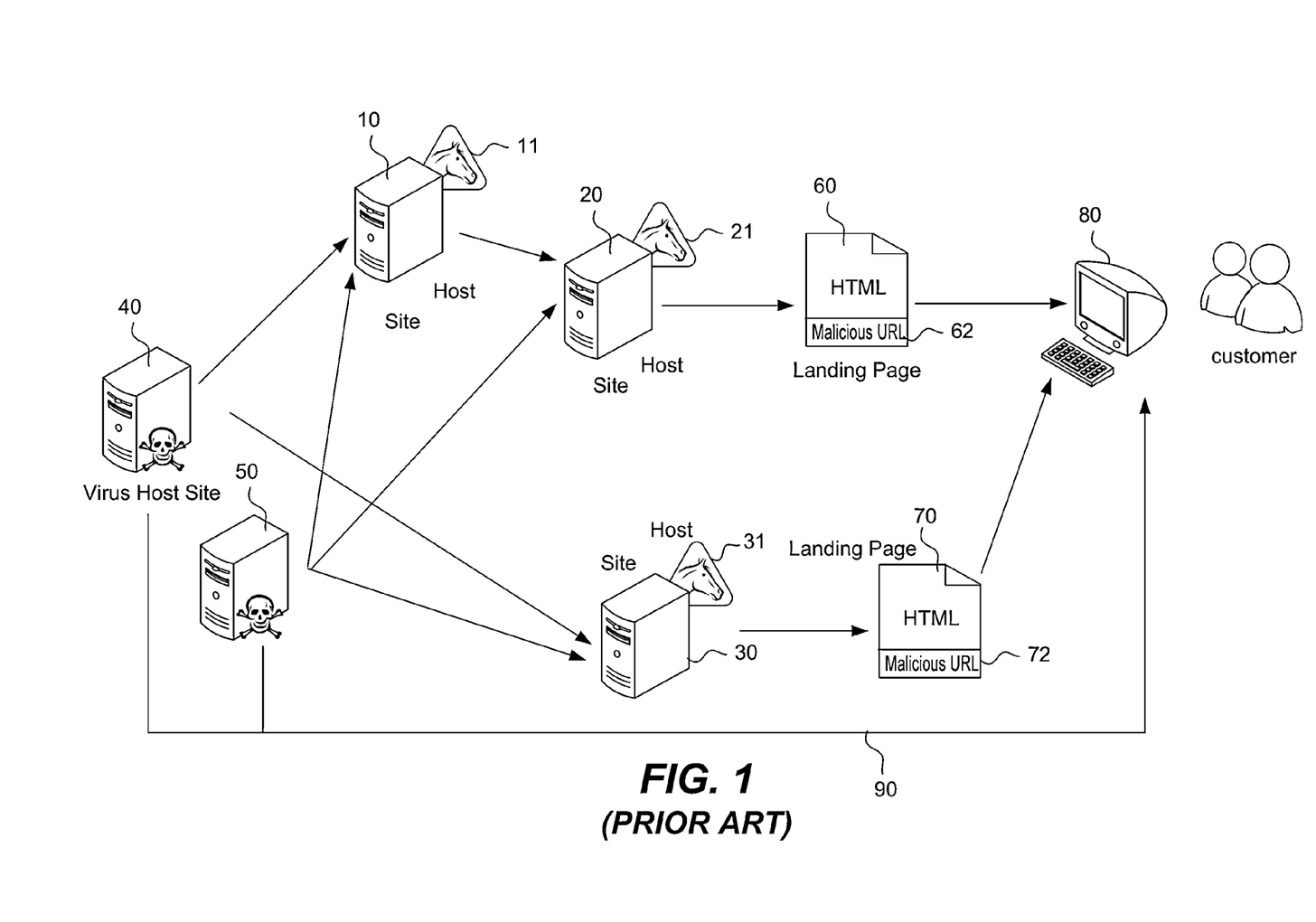
FIG. 1 illustrates a prior art environment in which a legitimate Web site is hijacked.

FIG. 1 illustrates a prior art environment in which a legitimate Web site is hijacked. Legitimate host Web sites are located on the World Wide Web and hosted upon server computers 10, 20 and 30 that are connected to the Internet. Malicious hackers are able to compromise these host sites and injects a malicious URL into one of the pages of these host sites as indicated by Trojan horse symbols 11, 21 and 31 (symbolizing malware known as a Trojan which might later infect a customer's computer via the malicious URL). There may be any number of malicious URLs injected into a page or pages of a legitimate host site, and a given host site may be compromised by more than one hacker.

A malicious URL is termed malicious because it has been inserted into the legitimate host site by a hacker and links to a malicious Web site such as a malicious site hosted on computers 40 or 50. Accordingly, Web pages 60 and 70 of legitimate sites located on computers 20 and 30 have been compromised and now include at least one malicious URL 62 or 72. When a customer uses computer 80 to view the legitimate site on computer 20 or 30, the web browser at computer 80 will automatically follow the malicious URL link 62 or 72 in which case malicious content from computers 40 or 50 may be downloaded 90 onto the user's computer 80 without user consent. Such a situation is to be avoided.

Currently, the Google Safe Browsing project provides a diagnostic page for various Web sites that record linking information reflecting the security of that site. For example, for a given Web site, the diagnostic page lists the number of pages at the site that result in malicious software being downloaded and installed onto a user computer without user consent, lists the type of malware and how many new processes are surreptitiously started on the target machine, mentions whether the site is an intermediary in the further distribution of malware, and whether or not the site has hosted malware recently. For example, a diagnostic page for the site "yahoo.com" describes that in a 90-day period in 2009 twenty pages of the site resulted in malicious software being downloaded, and that the malicious software included over 200 different malware programs. Unfortunately, this project does not propose any solutions to this problem.

One proposed solution is to crawl all Web sites in order to find malicious sites and uncover the various attack vectors located at these sites. Aside from the problem of the sheer magnitude of sites that must be crawled, many malicious sites are sophisticated enough (or the hacker is) to detect if a crawler is from an antivirus company and may be able to take evasive action to avoid detection. Further, most malicious sites change their domains frequently so the problem becomes a moving target that cannot be hit.

Another current approach is to reference a blacklist that lists which URLs are suspicious of being malicious and then screen these out. A similar approach uses a "Simple RegExp" match to identify an unknown malicious site. The problem with these approaches is that they cannot identify new threats located at newly formed malicious Web sites. Further, it can be challenging to detect a malicious URL in a Web page because there is often not enough direct information to make a positive identification, and, it can be difficult to retrieve the contents of pages pointed to by these malicious URLs.

Accordingly, a new approach is desired to be able to detect malicious URLs in legitimate Web sites in order to prevent malware from being downloaded to a user computer.

SUMMARY OF THE INVENTION

To achieve the foregoing, and in accordance with the purpose of the present invention, a new method is disclosed that detects malicious URLs on a Web page. The present invention provides an effective way to detect malicious URLs either on the client side or at the back end.

In a first embodiment, HTML code is scanned to determine features related to the layout of an embedded URL within the HTML code. A layout vector is formed and input into a classifier algorithm which outputs a score indicating whether or not the URL is malicious or not.

In a second embodiment, HTML code is scanned to determine features related to the referring relationship between the parent Web page associated with the HTML code and the child Web page to which the embedded URL links. The page rankings of both the parent and child Web pages may be obtained. A referring vector is formed and input into a classifier algorithm which outputs a score indicating whether or not the URL is malicious or not.

In a third embodiment, HTML code is scanned to determine an embedded URL. The contents of the Web page identified by that URL are retrieved and are compared to the contents of the parent HTML code. Comparison may be performed by analysis of keywords or by comparing categories of the Web pages. A relevancy vector is formed and input into a classifier algorithm which outputs a score indicating whether or not the URL is malicious or not.

In other embodiments, the layout and referring analysis may be combined and both their inputs may be input into the classifier algorithm. Or, the layout, referring and relevancy analysis may all be combined and their vectors input into the classifier algorithm.

In this fashion, the present invention may iterate through all embedded URLs that are found in the target HTML code. The HTML code desired by the user (typically a Web page that the user is attempting to download) may be intercepted by the present invention and not delivered if any malicious URLs are found, or, the HTML code may be delivered along with displayed warnings for any identified malicious URLs.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

In view of the current prior art approaches that are not optimal, it has been realized through extensive analysis that the number of Web sites compromised by an injected malicious URL is on the order of hundreds of times more common than the number of malicious Web sites to which these malicious URLs link. Therefore, an approach that targets these compromised Web sites will have a dramatic impact.

It is further realized that most all malicious URLs on a legitimate Web page contain useless information except for the URL itself. Accordingly, it is realized that most all malicious URLs that have been injected into a Web page are not relevant to the page into which they have been inserted for many different reasons. In other words, the various characteristics of a malicious URL on a Web page (or of the page to which it links) are incongruous with respect to the characteristics of the Web page itself.

Malicious URL Relevancy

Figure 2:
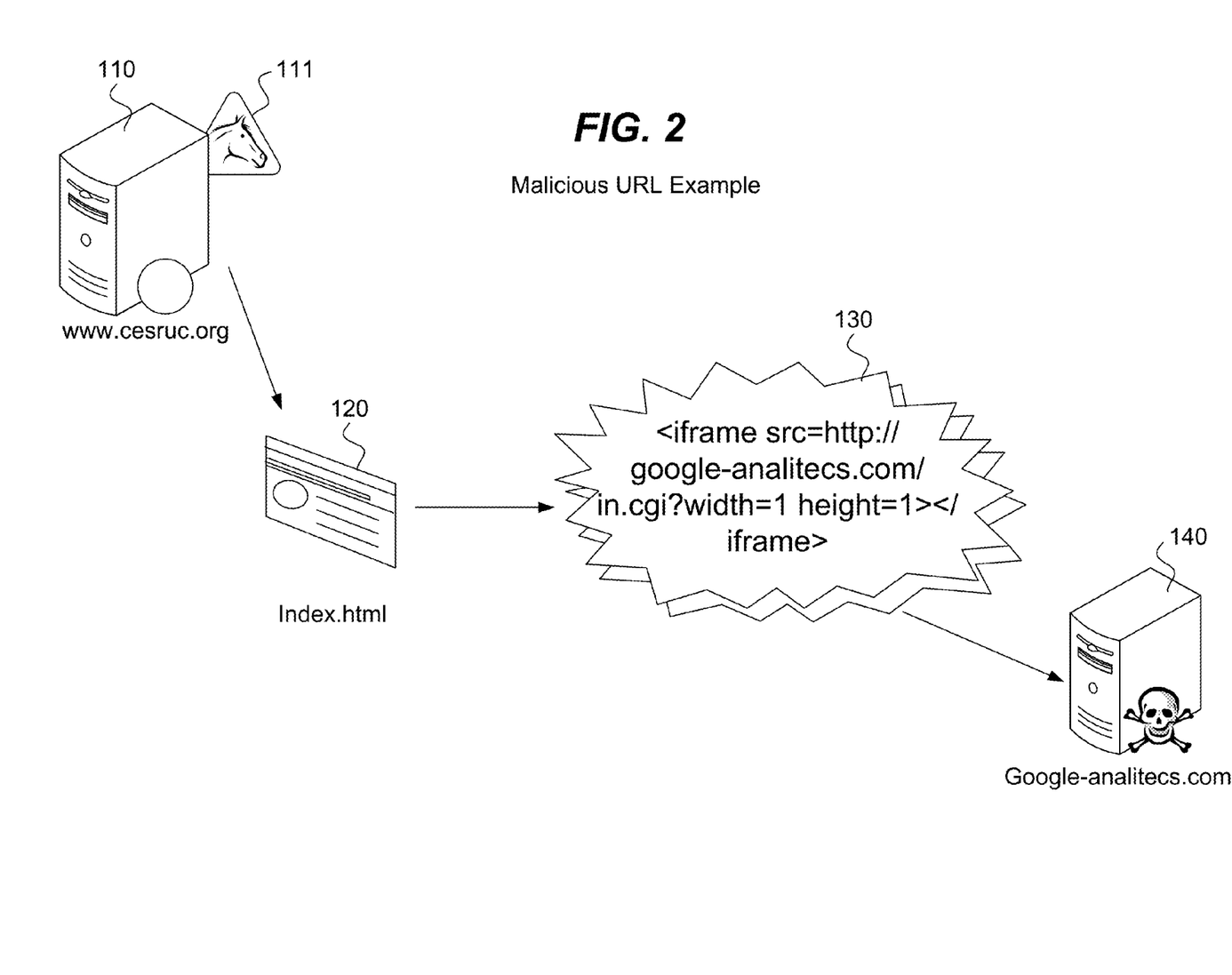
FIG. 2 provides an illustration of a URL that is not relevant to a Web page.

FIG. 2 provides an illustration of a URL that is not relevant to a Web page. As shown, a legitimate Web site "cesruc.org" is hosted on computer 110 and has been compromised by a malicious URL that has been injected into a Web page of this site, as indicated by symbol 111. Index 120 shows the web page which contains the injected malicious link, shown at 130, which in this case is a malicious URL in an iframe.

The injected malicious URL is shown at 130 inside a frame of HTML code and includes the malicious URL itself "google-analitecs.com." That malicious URL links to the malicious Web site hosted on a hacker computer 140. The characteristics of this malicious URL (and of the page to which it links) can be observed to determine their relevancy to the legitimate Web site. First, it is noted that this injected frame is invisible on the Web site. The frame is invisible in this case because the height and width is 1 pixel; thus, web browsers will only draw a point which users cannot find.

Further, this frame is located at the end of the HTML body. Also, the link from the malicious URL is to an unknown site with a low page rank. Accordingly, is realized after extensive research that most injected malicious URLs are not relevant to their host pages based upon various dimensions such as referring behavior, page layout and page content.

The first dimension of referring behavior relates to the relative page rank of the legitimate Web site and the malicious Web site pointed to by the malicious URL. It is recognized that relatively small, unknown Web sites typically point to more famous sites rather than pointing to their own pages (e.g., advertisements, article writers). Conversely, famous Web sites with high page ranks seldom referred to sites having low page ranks. Injected malicious URLs, however, cause relatively popular pages to redirect to an unknown site, most often the malware host computer. Most legitimate sites will never refer to these unknown malware sites except when the legitimate sites are compromised.

Research has been performed and more than 2.4 million external scripts and "iframes" from 1.1 million Web pages have been checked to support these results. It has been found that: over 83% of malicious links have lower page ranks than their legitimate hosts; over 96% of malicious "iframes" have lower page ranks than their legitimate hosts; and only 7% of legitimate Web pages refer to pages having lower page rankings. Accordingly, the conclusion may be drawn that a URL linking to a page having a lower page rank than the present page is likely to be a malicious URL.

The second dimension of page layout addresses the location and visibility of the injected URL on the legitimate page. Typically, injected malicious links are found in isolated sections of the page layout or are invisible. In other words, the injected URL is not visible (or hidden) in that it may be held by an invisible frame or script. Injected URLs being located in isolated sections mean that the URL is located either in the top section (header) or in the bottom section (footer) of the HTML body.

Research has been performed and it has been determined that: over 83% of malicious "iframes" are located in isolated sections of their host pages; only 4% of normal "iframes" meet the same criteria for being considered isolated; and over 5% of malicious scripts are located in isolated sections, but only about 0.35% of normal scripts are located in isolated sections. This last result means that a malicious script is 16 times more likely to be found in an isolated section of a Web page. Accordingly, the conclusion may be drawn that a URL that is not visible, or a URL located in isolated section of a Web page is likely to be a malicious URL.

The third dimension of page content addresses the content to which a link points. Most normal links on a Web page point to content at another Web site concerning the same general subject. For example, an article about soccer may include advertisements about (and links to) a FIFA video game. By contrast, malicious iframes typically link to content that is irrelevant to the host page, and links from malicious scripts are loosely coupled with a host page, at best. In other words, the malicious Web site to which the malicious URL points has irrelevant content.

Figure 3:
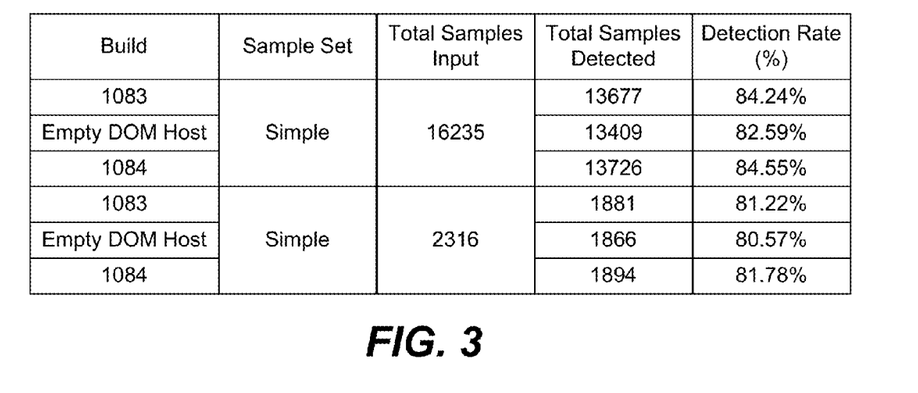
FIG. 3 illustrates a table showing content relationship.

FIG. 3 illustrates a table showing content relationship. We have used the product "Script Analyzer," available from Trend Micro, an engine that emulates scripts to detect malicious ones based on behavior. In our experiment, we emptied the HTML code of malicious scripts and watched how the Script Analyzer detection rate dropped. As expected, it dropped only slightly as shown in FIG. 3.

Accordingly, the conclusion may be drawn that if the contents of an iframe are not relevant to the host page, or if a script is loosely coupled with its host page, that the URL included in either of these is likely to be malicious.

System Architecture and Flow Diagram

Figure 4:
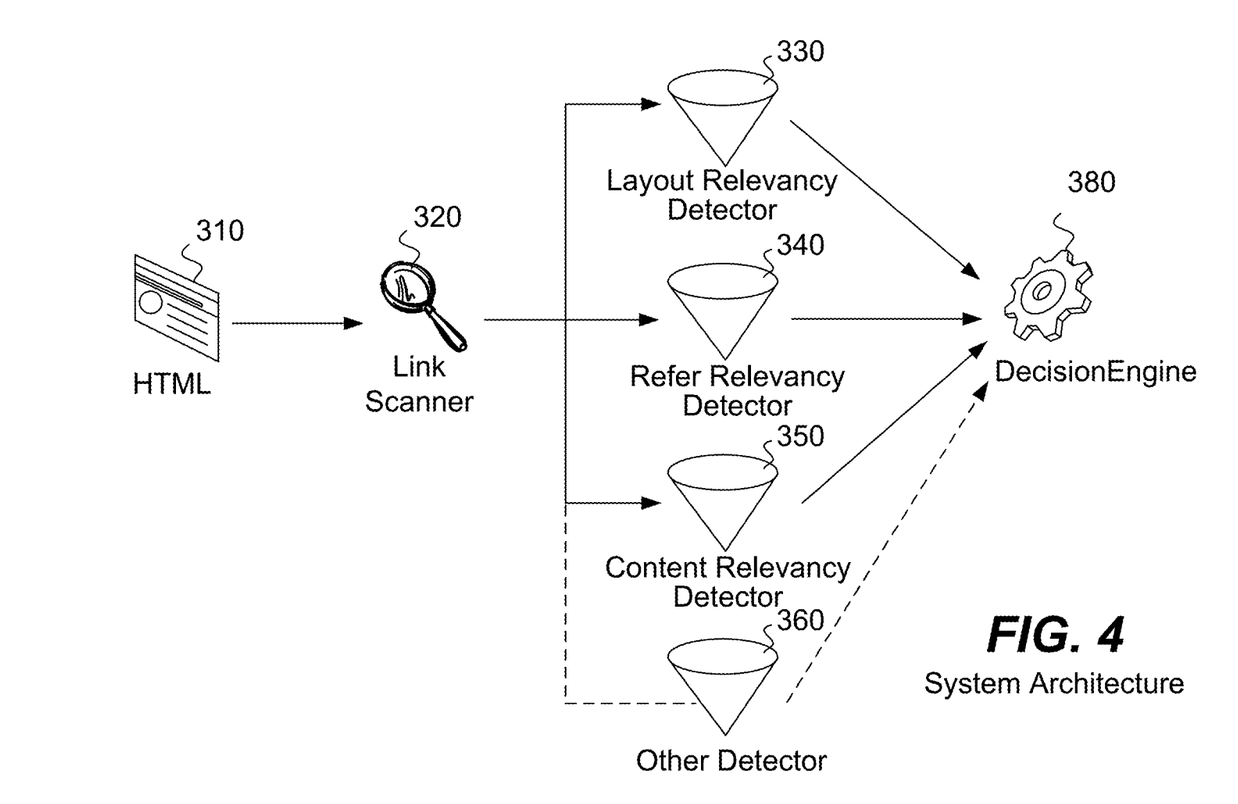
FIG. 4 illustrates an architecture of a system for determining whether a URL is malicious or not.

FIG. 4 illustrates an architecture of a system for determining whether a URL is malicious or not. In general, after retrieving relevance data using the three dimensions described above, the Bayes' theorem is used to calculate the possibility of a Web page being injected with a malicious URL.

HTML 310 represents HTML code that is to be analyzed and that may contain a malicious URL, iframe or script. This code may be the entire HTML code from a Web page or a portion thereof. A link scanner (or link analyzer) software module 320 makes a pass over the HTML code and retrieves various characteristics from the code useful for the page layout relevancy analysis, the referring behavior relevancy analysis, or the page content relevancy analysis. The link scanner will parse HTML into a DOM tree (data structure) in memory. Then it also will store information at nodes of the DOM tree for later detection. The output of the link scanner are monitoring features that are preprocessed before being input into detectors 330-360. In this specific embodiment, the monitoring features mean specific nodes and their attributes in the DOM tree after parsing. Of course, implementation of a link scanner to extract URLs, frames and scripts may be done using other techniques.

Software modules 330-360 are various detectors that take an input of characteristics of a URL in the code and determine how relevant those characteristics are to the Web page as a whole. The output from the detectors is a series of characteristic vectors. These vectors are, for example, a vector such as: [1,0,0,0,0,0,0,0,0,0,0,0,0,0,0,0,0,0,0,0,0,0,1,0,0,0,1,1,0,0, 1,0,0,0,1,0,0,0,1,0,0,0,0,1,0,1,0,0,0, 1,0,0,0,0,1,0,0,0,1,0].

The output of the detectors (the characteristic vectors) are fed to a decision engine 380 that uses a pre-trained model in order to classify the analyzed URL as being malicious or not. For example, the decision engine may be a Bayes algorithm engine or a support vector machine (SVM). The output from the decision engine will indicate whether or not the originally input HTML code includes a malicious link, such as a URL.

Figure 5:
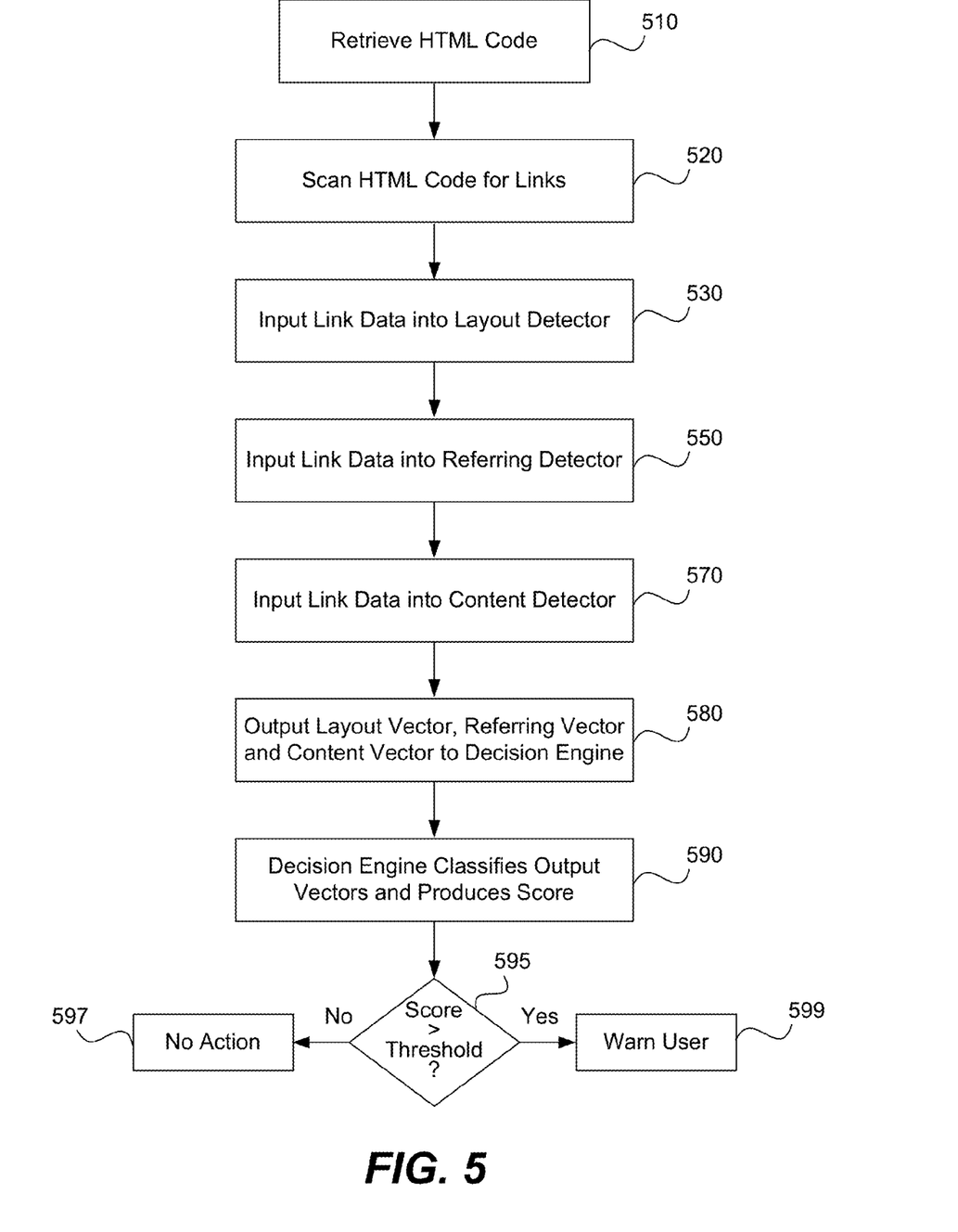
FIG. 5 is a flow diagram describing operation of the system.
Figure 6:
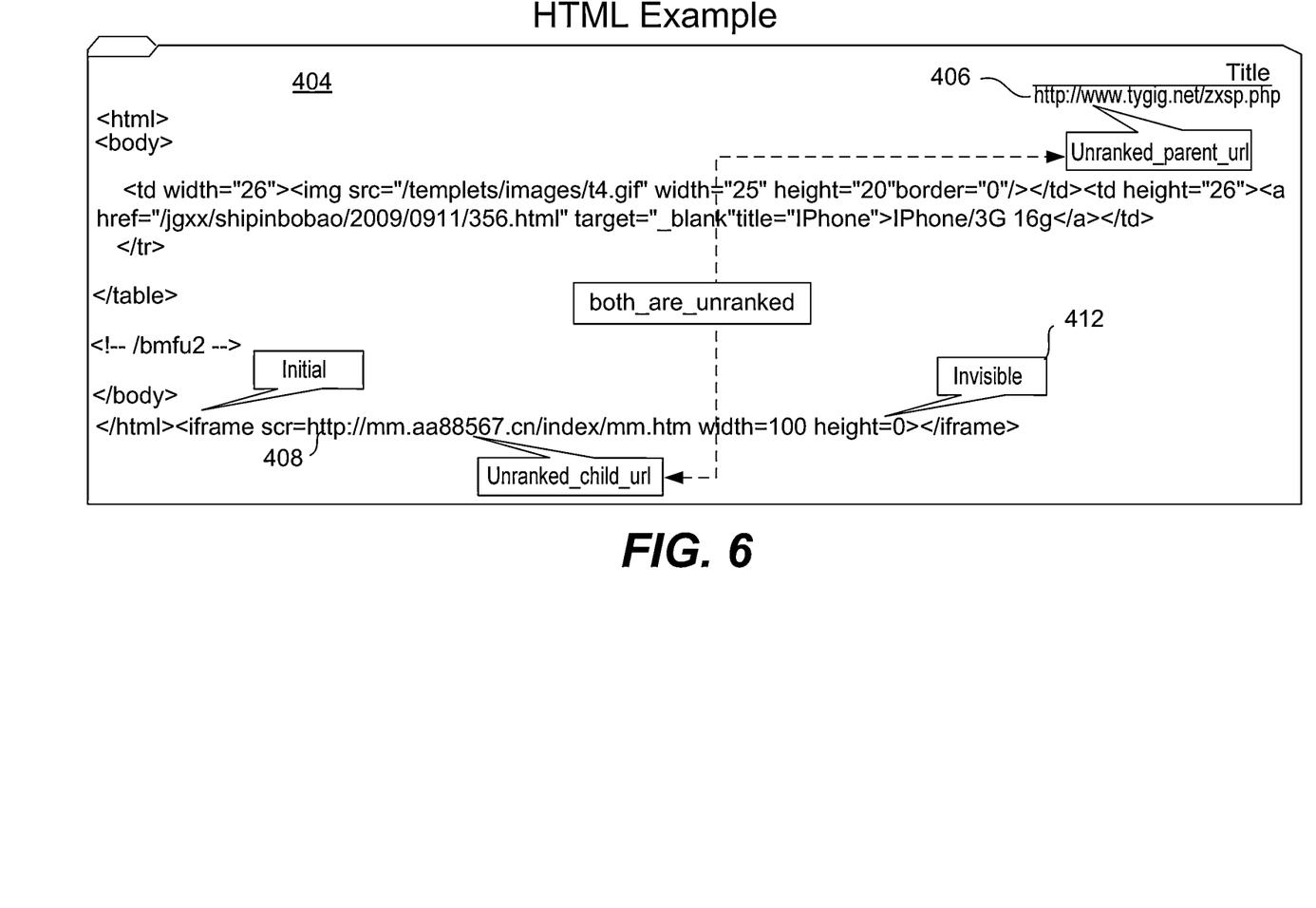
FIG. 6 shows suitable HTML code.

FIG. 5 is a flow diagram describing operation of the system. In step 510 any suitable HTML code is retrieved for analysis. For example, FIG. 6 shows suitable HTML code. This HTML code may be obtained via a backend Internet security system, such as those that routinely monitor Internet requests from computer users of an enterprise at a remote central location. Once the backend system analyzes the HTML code for malicious links and makes a decision, it may then inform the user of the enterprise regarding the nature of the links found in the HTML code. Or, the HTML code may be obtained directly from monitoring software operating on the user's computer. In this situation, the present invention is executing in a suitable software module directly upon the user's computer and can easily intercept HTML code that a user has downloaded from the World Wide Web using an Internet browser. This HTML code is typically a single page of code.

Next, in step 520, a link scanner software module 320 makes a pass over the retrieved HTML code and analyzes it for information and features that will be later input to the various detectors 330-360. The link scanner will analyze the HTML for frames or scripts because it is often the frames or scripts that include malicious URLs. All embedded links within the HTML are retrieved, especially those within frames or scripts. In addition, a variety of other information is extracted such as: the position of the frame or script in the HTML code; whether or not the frame or script is visible; the height, width and size of the frame; previous elements and post elements such as TD, DIV, TITLE, and so on. A typical "previous element" of an injected malicious script is "TD tag" in HTML, because most SQL injections will taint the data at the database (which is shown in the Table/TD at HTML). Other information includes the IP address and host name of the Web site where the HTML page can be found, whether a particular URL has any dynamic parameters, other attributes of a frame such as its border, and attributes of a script such as its language. This extracted information may be stored in memory, or may be simply noted and flagged in the HTML code for further analysis by the detectors 330-360.

If the HTML code includes ten URLs, for example, all this information may be sent to the detectors at once. Preferably, though, each URL is processed serially, and then once one URL has been processed and the decision engine makes a decision, the information regarding the next URL is input.

Extracted information for a particular URL link (perhaps embedded within a frame or script) is then input to each of the detectors 330-360 in parallel or serially. After processing this link information, the decision engine 380 then renders a decision regarding this particular link before beginning processing the next link retrieved from the HTML code.

In step 530 a portion of this extracted information is input into the layout relevancy detector 330 for a particular identified URL that has been found within a frame or a script. This detector may be a separate software module or may simply be software code included within a larger system. Input into the detector includes information about a particular URL within the HTML code such as the size of the frame in which it occurs, the visibility of the frame, the location and position of the frame within the HTML (such as whether it is in the body or in detail), etc. As mentioned above, this detector determines features of the URL link indicating whether or not its layout within the HTML code indicates that the URL link is malicious.

The layout relevancy detector analyzes this information, groups the information by features, and then assigns each feature a true or false value. A true or false value is represented by a "1" or a "0," respectively (or vice versa). Once all of these true and false values represented by their binary values have been ordered into a vector, this layout vector is then output in step 580 from the detector and passed on to the decision engine 380.

Here is an example of how to determine a layout vector based upon the extracted information that is input to the layout relevancy detector. Consider that the following information extracted from the HTML code will be input to the layout detector: whether or not the frame is invisible; whether the frame or script is in the header or in the tail; if the HTML tag is obfuscated; if the element is unique; if the element has a new line; if the previous element is TD; if the previous element is the same; if the next element is the same; if the next element is special; if the link has quality attributes (for example, the language of a script or the border of a frame), etc.

This extracted information lends itself to identifiable features such as: invisible; in_header; in_tail; htmltag_is_obfascated; element_is_unique; element_end_with_newline; previous_element_is_TD; previous_element_is_DIV; previous_element_is_same; next_element_is_same; next_element_is_special; has_quality_attributes; etc.

The layout vector may then be determined by assigning binary values to these identified features. For example, consider that particular HTML code has a frame in its tail such as: <if RaMe height=0 width=0 src="http://222.ebuy.com/index.html"/>. The output vector will then be assigned the following values for these features: invisible 0; inheader 0; intail 1; htmltag_is_obfascated 1; element_is_unique 0; element_end_with_newline 0; previous_element_is_TD 0; previous_element_is_DIV 0; previous_element_is_same 0; next_element_is_same 0; next_element_is_special 0; and has_quality_attributes 0. Finally, the output vector may then be simply written using the binary values thus: [1 0 1 1 0 0 0 0 0 0 0 0].

In step 550 a portion of the extracted information is input into the referring relevancy detector 340 for the particular identified URL that has been analyzed in the layout relevancy detector above. This detector may be a separate software module or may simply be software code included within a larger system. Input into the detector includes information regarding the URL of the parent Web site, information about the particular URL within the HTML code such as its host name, its domain name, whether it is a top-level domain, how many separate domains are included within the host name, whether or not the URL is dynamic, and what is the postfix of the URL. For example, while a normal script having a benevolent URL may use a postfix of GIF, a malicious URL may use JPEG as its postfix.

Figure 7:
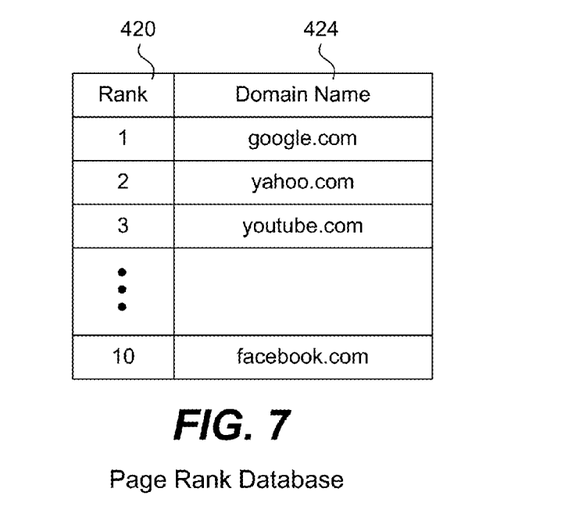
FIG. 7 illustrates a suitable page rank database that may be input to the detector or may be accessed by the detector.

Another input to detector 340 is page rank information. FIG. 7 illustrates a suitable page rank database that may be input to the detector or may be accessed by the detector. Such a database may be developed using any suitable inputs, data or analysis, and in one embodiment is developed using statistical data from a backend security system, such as one available from the Trend Micro Inc. As shown, the database includes a rank 420 and a corresponding domain name 424. This example database indicates that the highest-ranking domain name, "google.com," is accessed more often than other domain names. In one embodiment, this database is stored into a file and then loaded into memory for fast access by the referring relevancy detector. Preferably, a hash of each domain name is calculated and this hash is used for searching the database for fast results.

As mentioned above, this referring detector determines features of the URL and its parent Web page, indicating whether or not the referring behavior between the parent Web page and the URL indicates that the URL link is malicious. For example, if the URL of the parent Web site has a very high ranking but the suspect URL found in the HTML code has no rank at all, this indicates a high risk that the URL will be malicious.

The referring relevancy detector analyzes this information, groups the information by features, and then assigns each feature a true or false value. A true or false value is represented by a "1" or a "0," respectively (or vice versa). Once all of these true and false values represented by their binary values have been ordered into a vector, this referring vector is then output in step 580 from the detector and passed on to the decision engine 380.

Here is an example of how to determine a referring vector based upon the extracted information that is input to the referring relevancy detector. Consider that the following information extracted from the HTML code and the page rank database will be input to the layout detector: if the parent URL is in the top one thousand by rank; if the parent URL is in the top ten thousand; if the parent URL is in the top one hundred thousand; if the child URL is in the top one thousand; if the child URL is in the top ten thousand; if the child URL is in the top one hundred thousand; if both the parent and child URLs are ranked; if both are unranked; if only the parent is ranked; if only the child is ranked; if the child URL is an IP address; if the child URL is obfuscated; if the child URL is dynamic; whether or not the child URL has any special extensions (for example, a script URL points to a JPEG file).

This extracted information lends itself to identifiable features such as: parent_in_top_1K; parent_in_top_10K; parent_in_top_100K; child_in_top_1K; child_in_top_10k; child_in_top_100k; both_ranked; both_unranked; only_parent_ranked; only_child_ranked; child_is_IPAddress; child_is_obfuscated; child_is_dynamic; child_has_special_extension, etc.

The referring vector may then be determined by assigning binary values to these identified features. For example, consider that particular HTML code (which comes from "https://www.ebay.com/items/purchase.php") has a frame in its tail such as: <if RaMe height=0 width=0 src="http://%32%32%32%2Eebuy.comfindexjpg"/>.

The output vector will then be assigned the following values for these features: parent_in_top_1K 1; parent_in_top_10K 0; parent_in_top_100K 0; child_in_top_1K 0; child_in_top_10k 0; child_in_top_100k 0; both_ranked 0; both_unranked 0; only_parent_ranked 1; only_child_ranked 0; child_is_IPAddress 0; child_is_obfuscated 1; child_is_dynamic 0; child_has_special_extension 1. Finally, the output vector may then be simply written using the binary values thus: [1 0 0 0 0 0 0 0 1 0 0 1 0 1].

In step 570 a portion of this extracted information is input into the content relevancy detector 350 for the particular identified URL that has been found within a frame or a script. This detector may be a separate software module or may simply be software code included within a larger system. Input into the detector includes information about the particular URL within the HTML code such as the URL itself or the Web page identified by that URL. The content relevancy detector may accept as input the URL itself and will then follow that URL to retrieve the identified Web page, or the detector may directly accept the Web page identified by the suspect URL. In addition, the parent Web page is input either by identifying the parent URL or by supplying directly the HTML code. As mentioned above, this detector determines whether the content of the parent Web page is related to the content of the Web page identified by the suspect URL, in order to determine if the suspect URL is malicious or not.

Whether or not the content of a child Web page is relevant to the parent Web page may be determined in different manners. In one example, each page is crawled and significant keywords are extracted from each page. Then, the keywords from the parent Web page are compared to the keywords in the child Web page using comparison techniques such as those known to skill in the art. Keywords such as "Blog," "TV," "Movie," "Car," "Stock," "Insurance," "Basketball," or "PSP" may be compared. The results of this comparison can be used to assign a binary value to a feature such as "child_Web_page_relevant_to_parent_Web_page."

Another technique is to use a content category online database. Such a database includes a category broadly describing the content for any number of Web sites. In one column are listed the URLs for any number of Web sites, while in the second column is a corresponding category for each listed URL. For example, the categories include: pornography, social network, advertisement, arts, autos, education, electronics, finance, fashion, health, home, news, shopping, sports, travel, etc.

The content relevancy detector analyzes this input information such as parent and child keyword relevancy, category for parent, category for child, etc., groups the information by features, and then assigns each feature a true or false value. A true or false value is represented by a "1" or a "0," respectively (or vice versa). Once all of these true and false values represented by their binary values have been ordered into a vector, this content vector is then output in step 580 from the detector and passed on to the decision engine 380.

For example, features that may be assigned values include: child_Web_page_relevant_to_parent_Web_page; parent_is_pornography; parent_is_social_network; child_is_pornography; child_is_advertisement; both_share_same_category; etc. A layout vector may then be determined by assigning binary values to these identified features. The output vector may then be written using the binary values as explained above.

Because analysis of the child Web page requires that the suspect URL link be followed and the page downloaded, analysis using the content relevancy detector is optional. Downloading of the Web page contents requires a significant use of resources and can be used to reduce the risk of false positives if necessary.

Once all of the detectors have analyzed their particular information for a certain suspect URL of the HTML code (or have analyzed a particular frame or scripts), the decision engine 380 processes the layout vector, referring vector and content vector in order to determine if the suspect URL is malicious or not in step 590. The decision engine 380 may be any suitable classifier algorithm, such as a Bayes classifier or a Support Vector Machine (SVM) classifier. Other classifier algorithms that may be used include a decision tree, a neural network, etc.

When a new HTML code sample is submitted to the link scanner and analyzed by the relevancy detectors, the output vectors are input to the Bayes classifier. A final score is calculated by the classifier and is used to determine whether an embedded URL is malicious or not in step 595. Currently, the score varies between a value of 0 and 1.0. Any score greater than 0.9 results in a conclusion that the embedded URL is malicious in step 599. If so, then a warning message may be output to the computer user indicating that a particular URL found in a Web page is likely to be malicious. If a URL is found to be malicious then by default the URL may not be visited.

As is known in the art, a classifier algorithm such as the Bayes classifier is trained using known samples in order that the classifier learns. In the present invention, over one million normal samples (i.e., benevolent embedded URLs in HTML code) and ten thousand malicious embedded URLs were submitted to the Bayes classifier for training. Such training may be repeated and is known to those of skill in the art.

Once a particular embedded URL has been analyzed and a decision output, then the system loops back and continues to analyze other embedded URLs found within the original HTML code. In other words, the system analyzes each URL one by one.

Computer System Embodiment

Figure 8A:
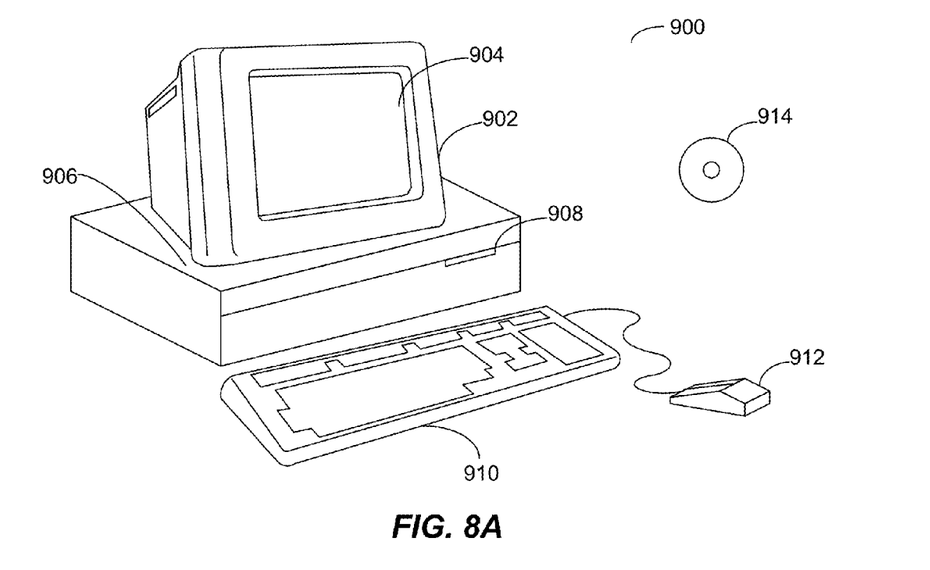
FIGS. 8A and 8B illustrate a computer system suitable for implementing embodiments of the present invention.
Figure 8B:
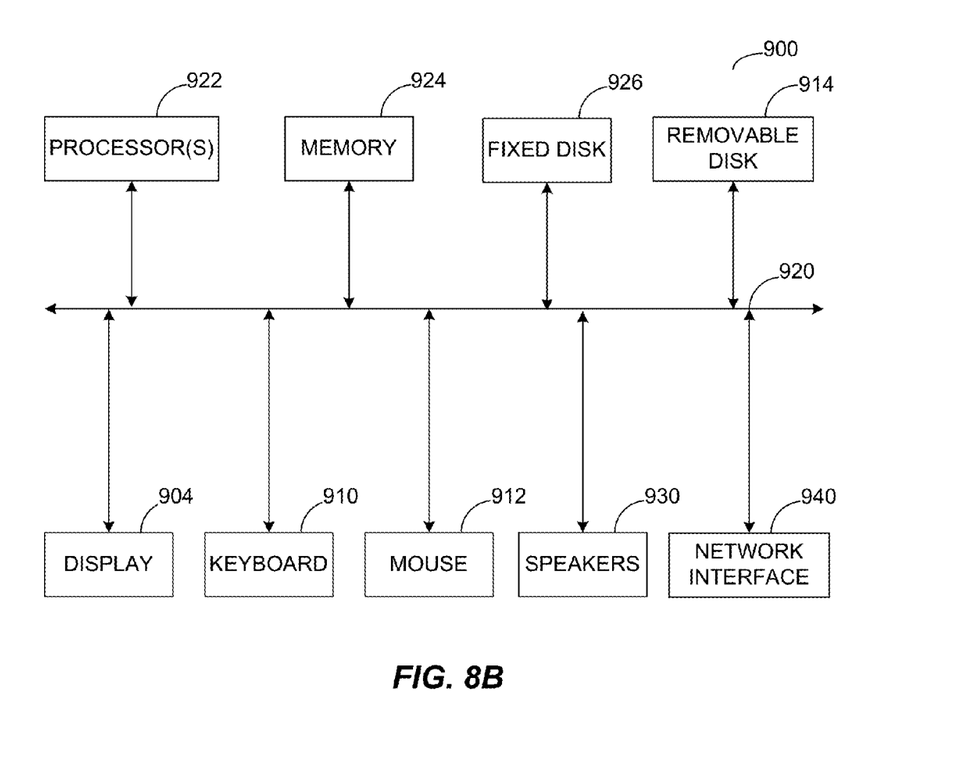

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of detecting a malicious URL, said method comprising:

retrieving HTML code representing a Web page;

scanning said HTML code and identifying at least one embedded URL of said HTML code;

identifying layout features of said embedded URL related to the layout of said embedded URL within said HTML code, one of said layout features indicating that said embedded URL is located within the header or the footer of said HTML code;

producing a numerical layout vector that indicates the presence of said layout features;

processing said numerical layout vector using a classifier algorithm; and outputting a score from said classifier algorithm indicating the likelihood that said embedded URL of said HTML code is a malicious URL.

2. A method as recited in claim 1 wherein said classifier algorithm is a Bayes classifier or a Support Vector Machine (SVM) classifier.

3. A method as recited in claim 1 wherein said embedded URL is included within a frame or a script of said HTML code.

4. A method as recited in claim 1 further comprising:
intercepting a request from a browser of a computer user to download said HTML code representing said Web page; and
downloading said HTML code, whereby said HTML code is retrieved.

5. A method as recited in claim 1 further comprising:
determining a page rank of a child Web page identified by said URL;
producing a numerical referring vector that at least indicates said determined page rank; and
inputting said numerical referring vector into said classifier algorithm.

6. A method as recited in claim 1 further comprising:
retrieving the content of a child Web page identified by said URL;
producing a numerical content vector indicating the relevancy between said content and the content of said HTML code;
inputting said numerical content vector into said classifier algorithm.

7. A method of detecting a malicious URL, said method comprising:
retrieving HTML code representing a parent Web page;
scanning said HTML code and identifying at least one embedded URL of said HTML code, wherein it is unknown as to whether said embedded URL is malicious or not;
determining a parent page ranking for said parent Web page and a child page ranking for a child web page identified by said embedded URL;
determining referring features of said URL using said parent and child page rankings;
producing a numerical referring vector that indicates the presence of said referring features;
processing said referring layout vector using a classifier algorithm; and
outputting a score from said classifier algorithm indicating the likelihood that said embedded URL of said HTML code is a malicious URL, wherein said score is based upon said parent and child page rankings.

8. A method as recited in claim 7 wherein said classifier algorithm is a Bayes classifier or a Support Vector Machine (SVM) classifier.

9. A method as recited in claim 7 wherein said embedded URL is included within a frame or a script of said HTML code.

10. A method as recited in claim 7 further comprising:
intercepting a request from a browser of a computer user to download said HTML code representing said parent Web page; and
downloading said HTML code, whereby said HTML code is retrieved.

11. A method as recited in claim 7 further comprising:
accessing a page rank database;
determining said parent and child page rankings using said page rank database.

12. A method as recited in claim 7 further comprising:
identifying layout features of said URL related to the layout of said URL within said HTML code, one of said layout features indicating that said URL is located within the header or the footer of said HTML code;
producing a numerical layout vector that indicates the presence of said layout features;
inputting said numerical layout vector into said classifier algorithm.

13. A method as recited in claim 7 further comprising:
retrieving the child content of said child Web page identified by said embedded URL;
producing a numerical content vector indicating the relevancy between said child content and the content of said HTML code;
inputting said numerical content vector into said classifier algorithm.

14. A method of detecting a malicious URL, said method comprising:
retrieving HTML code representing a parent Web page;
scanning said HTML code and identifying at least one embedded URL of said HTML code;
retrieving the content of a child Web page identified by said embedded URL;
determining relevancy features representing the relevancy between said HTML code and said retrieved content;
producing a numerical relevancy vector indicating said relevancy features;
inputting said numerical relevancy vector into a classifier algorithm; and
outputting a score from said classifier algorithm indicating the likelihood that said embedded URL of said HTML code is a malicious URL.

15. A method as recited in claim 14 further comprising:
determining said relevancy features by comparing keywords of said HTML code to keywords of said retrieved content.

16. A method as recited in claim 14 determining said relevancy features by comparing a category of said HTML code to a category of said retrieved content.

17. A method as recited in claim 14 further comprising:
intercepting a request from a browser of a computer user to download said HTML code representing said parent Web page; and
downloading said HTML code, whereby said HTML code is retrieved.

18. A method as recited in claim 14 further comprising:
determining a page rank of said child Web page identified by said embedded URL;
producing a numerical referring vector that at least indicates said determined page rank; and
inputting said numerical referring vector into said classifier algorithm.

19. A method as recited in claim 14 further comprising:
identifying layout features of said URL related to the layout of said embedded URL within said HTML code, one of said layout features indicating that said embedded URL is located within the header or the footer of said HTML code;
producing a numerical layout vector that indicates the presence of said layout features; and
inputting said numerical layout vector into said classifier algorithm.

20. A method as recited in claim 14 further comprising:
displaying a warning to said computer user if said score indicates that said embedded URL is malicious.

21. A method as recited in claim 7 further comprising:
    determining that said parent page ranking is relatively high when compared to said child page ranking.

22. A method as recited in claim 7 wherein said parent and child page rankings reflect the popularity respectively of said Web page and of said Web site identified by said embedded URL.

23. A method as recited in claim 7 wherein said parent and child page rankings reflect how often said Web page and said Web site identified by said embedded URL are accessed.

24. A method as recited in claim 7 wherein at least one of said referring features indicates a page rank of said Web page relative to a page rank of said embedded URL.

25. A method as recited in claim 14 further comprising:
    comparing said HTML code of said parent Web page to said retrieved content of said child Web page identified by said embedded URL to determine said relevancy features.

\* \* \* \* \*